United States Patent [19]

Bryan, Jr. et al.

[11] Patent Number: 4,598,273

[45] Date of Patent: Jul. 1, 1986

[54] LEAK DETECTION SYSTEM FOR ROOFS

[76] Inventors: Bynum O. Bryan, Jr., 447 Suite B. South Sharon Amity; Earl Seagrave, 2915 Providence Rd., both of Charlotte, N.C. 28211

[21] Appl. No.: 641,516

[22] Filed: Aug. 16, 1984

[51] Int. Cl.[4] .......................... G08B 1/08; G08B 21/00
[52] U.S. Cl. .................................... 340/539; 340/602; 340/604; 340/605; 200/61.04; 200/61.05; 52/173 R; 52/1; 73/73; 73/290 R; 73/304 R; 73/592; 318/483; 324/61 R
[58] Field of Search ............... 340/539, 602, 604, 605, 340/618; 52/173 R, 1; 200/61.04–61.07; 73/73, 592, 304 R, 307, 290 R; 318/482, 483; 324/61 R, 61 P

[56] References Cited

U.S. PATENT DOCUMENTS

| | | |
|---|---|---|
| 362,010 | 4/1887 | Jewill . |
| 1,786,843 | 12/1930 | Hedeby ............................ 200/61.05 |
| 2,360,434 | 10/1944 | Manning .............................. 340/602 |
| 2,497,852 | 2/1950 | Arenstein . |
| 2,668,202 | 2/1954 | Kaplan ............................. 200/61.05 |
| 2,681,571 | 6/1954 | Becker ................................ 340/604 |
| 2,735,907 | 2/1956 | Inman ............................... 200/61.05 |
| 2,752,586 | 6/1956 | Jordan ................................ 340/602 |
| 2,759,175 | 8/1956 | Spalding . |
| 2,781,413 | 2/1957 | Luening .............................. 340/539 |
| 2,790,893 | 4/1957 | Lane . |
| 2,968,688 | 1/1961 | Skinner . |
| 3,129,413 | 4/1964 | Watson . |
| 3,252,155 | 5/1966 | Surtees et al. . |
| 3,338,384 | 8/1967 | Carrier, Jr. . |
| 3,383,863 | 5/1968 | Berry . |
| 3,460,123 | 8/1969 | Bass .................................... 340/602 |
| 3,721,970 | 3/1973 | Niemoth .......................... 200/61.05 |
| 3,818,468 | 6/1974 | Toth et al. .......................... 340/539 |
| 4,110,945 | 9/1978 | Sheahan ............................. 340/602 |
| 4,153,881 | 5/1979 | Permut et al. ...................... 340/539 |
| 4,264,902 | 4/1981 | Miller ................................. 340/604 |

FOREIGN PATENT DOCUMENTS 579700  7/1959  Canada .

*Primary Examiner*—Donnie L. Crosland
*Attorney, Agent, or Firm*—Bell, Seltzer, Park & Gibson

[57] ABSTRACT

A moisture intrusion detection system is provided, wherein a plurality of independent and insular moisture detecting units are placed in a predetermined spaced apart relationship across the surface of a roof structure, or other system incorporating a water impermeable membrane, beneath the water impermeable membrane thereof. Each of the detecting units includes a moisture detecting and power supply unit and signalling unit. When moisture penetrates the water impermeable membrane of the roof structure, a leak condition exists and a water activated battery is activated. Each detecting unit in contact with water is activated. In combination with the detecting units, position and direction locator apparatus are used in combination with the detecting units to localize the source of the leak and the extent of any water damage caused thereby.

9 Claims, 5 Drawing Figures

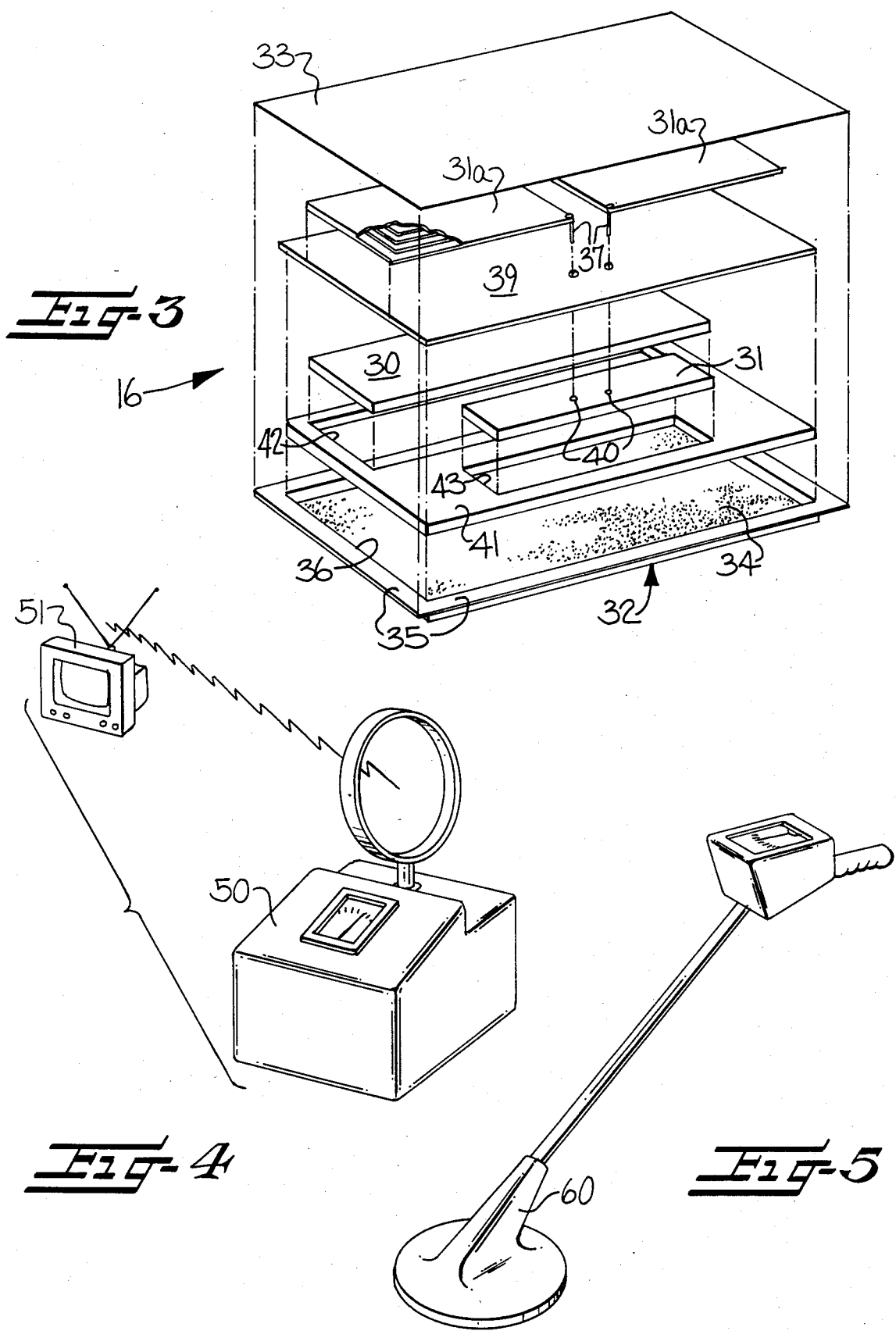

LEAK DETECTION SYSTEM FOR ROOFS

FIELD OF THE INVENTION

This invention relates to systems for the detection of leaks and particularly to systems incorporated in roof structures for detecting leaks which occur therein.

PRIOR ART AND BACKGROUND OF THE INVENTION

It is well known that roof structures are prone to develop leaks, the magnitude of the problem increasing proportionally to the age of the roof structure and the severity of surrounding environmental conditions. In addition, a new roof may also develop leaks prematurely for various reasons including improper construction, storm damage, etc.

Unfortunately, it is often the case that such leaks go undetected for substantial periods of time. When such leaks become detectable as discoloration of ceilings or noticeable accumulations of water, substantial damage has already occured, this damage being largely avoidable, had the leak been detected at an early stage. Another problem associated with roof leaks is localizing the source of the leak and the extent of the damage caused thereby.

Composite material roofs, such as those used in most industrial construction, present a most difficult challenge in attempting to locate the source of a leak and the extent of the damage caused thereby. These composite roofs are substantially planar, with very slight pitch. Because they are flat or nearly so, facility utilities such as heat, air conditioning, vents and the like are located up on the roof. These roofs are therefore subject to more traffic which accelerates wear. In addition, because composite roofs are flat or nearly so, water tends to accumulate thereon. If a leak occurs, composite roofs allow this standing water to creep far from the location of a hole in the portion of a composite roof known as the water impermeable membrane. This condition is known as a "membrane fault". Thus, the indicia by which a leak manifests itself may be far from the source of the membrane fault. Failure to detect and repair such a leak will result in loss of insulation efficiency and deterioration of roof support materials.

Roof leak detection systems directed towards solving the above-noted problems have been proposed. For example, U.S. Pat. No. 4,110,945 to Sheahan discloses such a device. In the Sheahan system, a plurality of spaced apart water sensing elements are disposed beneath the water impermeable membrane, adjacent the roof deck. Individual connecting means for each detecting unit, in the form of wires, are provided and lead from each of the water sensing elements to an instrument to determine if any of the individual sensing means have been activated due to contact with water.

The Sheahan system is not without its inherent drawbacks. The individual hard wired connections required by this system make installation cumbersome and difficult. Special care must be taken in placing the aforementioned wires on the roof surface as considerable activity occurs during the roof fabrication process which can damage or dislodge any of these numerous wires. Installation may be more expensive due to code or other regulations which may require more than one workman to participate in the installation of the Sheahan system (i.e., a roofer and an electrician). On the other hand, were installation by a single construction worker to be permitted, the requisite knowledge of the National Electrical Code and of basic electronics would likely be lacking in the typical roofer. Yet another problem of the Sheahan system is that the wires may become dislodged or damaged during the removal of an old roof or in the preparation of the surface upon which the new roof will be constructed.

It is accordingly an obJect of the invention to provide a system for the early detection of the occurrence and location of a leak and one which obviates the deficiencies of previously proposed systems.

Another object of the invention is to provide a roof leak detection system which can be quickly and easily installed without special care and wherein the knowledge possessed by the typical roofer is sufficient to ensure a working system, once installed.

A further object of the invention is to provide a leak detection system which is virtually immune to being damaged or dislodged during the construction or repair of the roof.

A still further object is to provide a roof leak detection system in which any one or more of the components may be replaced without effecting the remainder of the system.

SUMMARY OF THE INVENTION

The benefits and advantages of the present invention are achieved in a wireless roof leak detection system wherein a plurality of insular self-contained moisture detecting and signalling units are placed in a predetermined spaced apart arrangement, beneath the water impermeable membrane portion of a roof structure. In the preferred embodiment, a water activated battery supplies power to the signalling means when a leak occurs. A housing is also provided that encloses each unit of the leak detection system and includes openings for allowing the ingress of moisture to activate the unit.

Although a roof leak detection system is specifically disclosed herein, it is recognized that the instant invention may be employed with equal efficacy in any system incorporating a water impermeable membrane, such as for example, swimming pool liners, pond liners, dams, foundation walls, underground water lines and the like.

BRIEF DESCRIPTION OF THE DRAWINGS

Some of the features and advantages of the invention having been briefly stated, others will appear from the detailed description which follows, when taken in connection with the accompanying drawings, in which

FIG. 3 is an exploded isometric view of one of the sensing and signalling means of the leak detection system of the present invention;

FIG. 4 is an isometric view of the direction locator apparatus used to detect the roof or roofs containing one or more activated moisture sensing and signalling means; and FIG. 5 is an isometric view of the position locator apparatus used to detect the activated moisture sensing and signalling means on a given roof structure.

DETAILED DESCRIPTION OF THE ILLUSTRATED EMBODIMENT

The moisture intrusion detection system of the present invention may be easily adapted for use with any type of roof structure (such as shingle, tin, etc.), but is particularly applicable to composite roofs and its application in combination therewith will therefore be described in detail.

Figure 1:
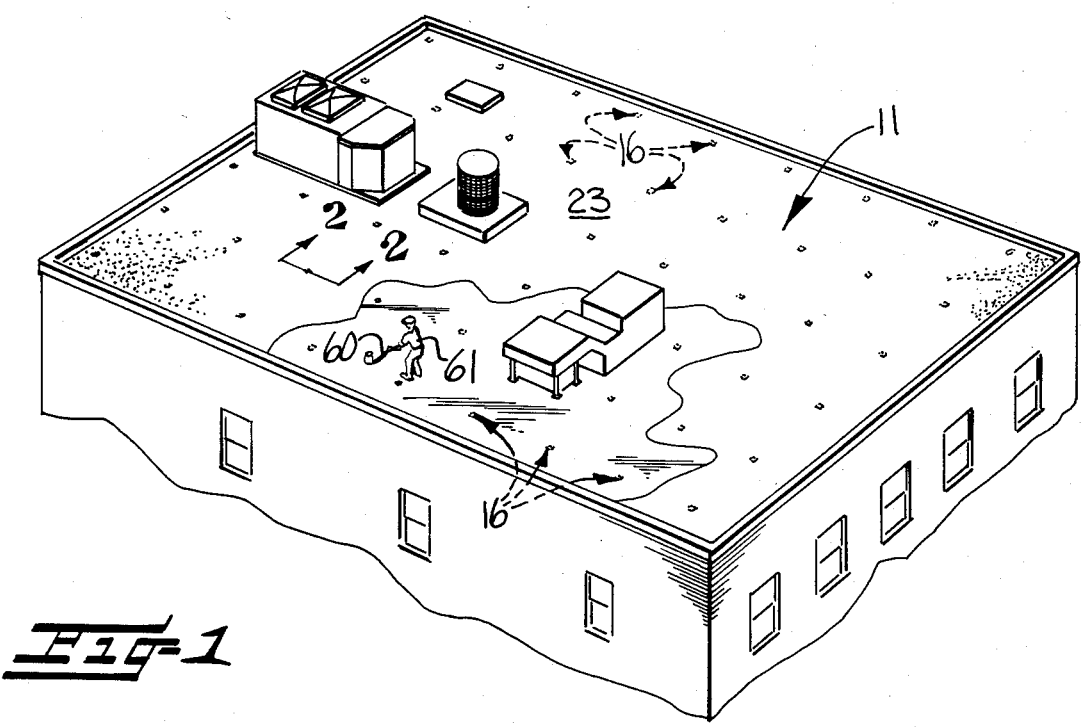
FIG. 1 is a fragmentary perspective view of a building including a built-up roof embodying the invention.

Referring now more particularly to the drawings and specifically to FIG. 1, a building having a typical built-up or composite roof is therein depicted. Roofs of this type are flat and are constructed with a slight pitch to promote water drainage. However, it is axiomatic that due to factors such as settling of the building and imperfect construction, that virtually all such roofs contain surface irregularities. These surface irregularities retard water drainage and water puddles form after a rain storm. As roofs of this type are flat, various utilities such as air conditioning, heating units and air vents are located directly upon the roof. The servicing of these units causes additional wear and tear on the roof and as a result, leaks are likely to occur earlier than one would have otherwise predicted.

Figure 2:
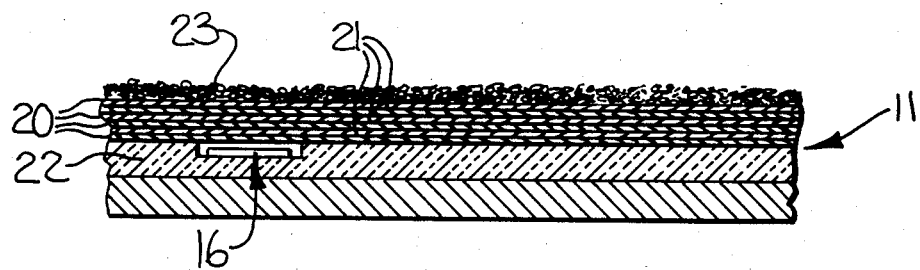
FIG. 2 is an enlarged fragmentary view taken along line 2—2 of the built-up roof of FIG. 1 showing the location of one of the sensing and signalling means of the leak detection system of the present invention.

A typical built-up roof 11 may take various forms, but generally comprises multiple layers of roofing felts 20 coated with asphalt or tar bitumen 21 which in the aggregate, form the water impermeable membrane (FIG. 2). The quality of a roof of this type is proportional to the number of and type of membrane layers, the quality of materials, labor and continual maintenance being directly proportional to the expected life of the roof. A composite roof will usually have from three to five such bitumen and roofing felt layers. The water impermeable membrane is typically sandwiched between a layer of insulation 22 on the surface innermost to the building ceiling and an outer covering of gravel and bitumen 23 which is exposed to the elements which causes the roof system to degrade, and eventually to fail. In accordance with this invention, a plurality of sensors in the form of moisture sensing and signalling means 16 are placed in a predetermined spaced apart relationship across the surface of the roof. As illustrated, each of the moisture sensing and signalling means 16 is located in a recess in the insulation roof layer 22, immediately below the water impermeable membrane. Each unit 16 includes moisture detecting and power supply means 30, signalling means 31 and housing means 32 enclosing the moisture detecting and power supply means 30 and signalling means 31 (FIG. 3). The housing means, includes a top cover 33 and a base 34. The base 34 includes a raised lip 35 extending around the outer periphery thereof. This raised lip defines a rectangular cavity 36 which confines the aforementioned components which, in the aggregate serve to define the basic building block unit of the instant leak detection system.

The moisture detecting and power supply means 30 of the present invention must possess the characteristics of extended shelf life (on the order of 10 years) and must activate the signalling means in the presence of moisture. A water activated battery which takes the form of a magnesium-cuprous chloride battery compound serves this function ideally as it is characterized by a long shelf-life and, once wet will remain active until completely discharged. Although magnesium-cuprous chloride is preferred for fresh water, it is recognized that other similar compounds exist or may be later developed which will perform the same function with equal efficacy.

In certain high humidity environments the water activated battery may be subject to unacceptable degradation over time. To alleviate this potential probem the water-activated battery material may be encased in a more moisture resistant casing, such as polyvinyl alcohol. This coating is similar to the protective coating applied to protect pharmaceuticals in pill form. This coating is relatively stable in the presence of moisture, but will dissolve when immersed in water. It is recognized that coatings other than polyvinyl alcohol may be suitable to protect the moisture sensing and signalling means and can be activated to dissolve at various predetermined moisture levels.

In an alternate embodiment of this invention the water activated battery can be replaced by a battery having a long shelf-life (such as a lithium cell) and a water-activated switch. Thus, when sufficient water is present to close the switch, the battery supplies power to the signalling means and the unit is activated. Under appropriate circumstances, this arrangement may be used in lieu of the above described water activated battery, as this arrangement is less sensitive to faulty activation and long term degradation which may be present in high humidity environments.

It is contemplated that the signalling means 31 includes an electronic radio transmitter. The transmitter may be fabricated by one of the many integrated circuit technologies available. However, the basic principle of the invention may be practiced regardless of whether the transmitter 31 is completely or partially integrated. The general requirements of the transmitter are that the unit be physically small and low power consuming. As previously stated, no specific transmitter species is required, but field effect transistors powering a class C continuous wave oscillator is preferred. Frequencies and power levels must be chosen to match the capabilities of the particular power source selected, the detection equipment, and to meet FCC requirements. In the preferred embodiment each roof will contain a plurality of electronic radio transmitters 31, all transmitting at the same frequency. However, in some situations, it may be appropriate for each moisture sensing and signalling unit 16 to have its own discrete transmitting frequency. To reduce the average power consumption of the moisture sensing and signalling means, once activated, a pulsed or pulse coded circuit arrangement may be incorporated into the transmitter units. Individually pulse coding each transmitter serves to further simplify the procedure of identifying the location or building with one or more activated moisture sensing and signalling units as the location of each individually coded unit may be noted and mapped prior to placement in any given system.

The signalling means 31 further includes antennas 31a which may be fabricated from any suitable material so long as they are appropriately insulated from the moisture detecting and power supply means 30 and transmitter 31 as well as protected from moisture intrusion. Each antenna 31a includes an integral connector 37 which extends through holes 38 in a mounting plate 39 so as to permit connection to the transmitter 31. The pins are of a length sufficient to extend downwardly from the underside of the antennas through the mounting plate 39 to be received by corresponding receptacles 40 in the transmitter 31.

A spacer 41 with two cut out areas 42, 43 is also provided which supplies support and containment means for the moisture detecting and signalling means, respectively. The entire housing means 32 is constructed out of a material suitable to withstand mishandling during installation, such as high-impact plastic or other similar material. In addition, means such as heat, adhesive glue or chemical welding techniques, are provided for sealing the housing once the moisture sensing and signalling unit has been assembled from its constituent parts.

Each individual moisture sensing and signalling unit 16 is designed to be isolated from all other units and to be completely self-contained. Thus, installation requires no special skill, equipment or procedure. The presence of a leak causes water to enter the housing through moisture ingress means and to cause the moisture detecting and power supply means 30 to become activated. Moisture ingress means are provided in the form of a porous base 34, which enables water to enter the housing cavity and upon the presence of sufficient quantities of water the chemical reaction of the water with the battery causes the transmitter to be supplied with power to enable a radio frequency to be emitted therefrom.

This radio signal may then be detected by a signal receiving means to alert maintenance personnel that a leak exists in a particular building by using a direction locator 50 (FIG. 4). Once the building with the leaky roof is established, the location of the membrane fault and the extent of the water permeation may be determined by using a position locator 60 (FIG. 5). It is contemplated, that the direction locator 50 will be vehicle-mounted and that this vehicle includes indicator means such as a video screen 51, which cooperates with the direction locator 50. Thus, as the vehicle traverses a complex of buildings and polls each building, the particular roof emitting a signal as the result of an activated moisture sensing and signalling unit can be determined. Thereafter, the position locator 60 can be used by an operator 61 working on the roof previously determined to hold at least one activated detector and can traverse the roof in order to locate the activated detector, or detectors as shown in FIG. 1, thereby enabling the location and extent of the leak to be quickly and easily determined.

In the drawings and specification there have been disclosed typical preferred embodiments of the invention, and although specific terms are employed, they are used in a generic and descriptive sense only, and not for the purposes of limitation.

What is claimed is:

1. A leak detection system for composite roof structures comprising a plurality of self-contained independent moisture detecting and signalling units adapted to be placed in a predetermined spaced apart, insular arrangement beneath a water impermeable membrane of the roof structure, each of said leak detecting and signalling units comprising:

moisture detecting and power supply means adapted to be activated and to produce electrical energy upon the introduction of moisture above a predetermined amount, signalling means connected to said moisture detecting and power supply means for emitting a signal upon activation of said moisture detecting and power supply means, and housing means enclosing said moisture detecting and power supply means and said signalling means to protect said moisture detecting and power supply means and said signalling means during installation and use and providing ingress of moisture if a leak occurs, whereby if a leak occurs moisture will enter said housing, activate said moisture detecting and power supply means which in turn supplies electrical energy to said signalling means thus indicating that a leak exists so that appropriate remedial action may be taken.

2. A leak detection system according to claim 1 wherein said signalling means is an electronic radio transmitter.

3. A leak detection system according to claim 2 wherein said plurality of units are set to the same frequency.

4. A leak detection system according to claim 1 further comprising a signal receiving means for locating the activated signalling means thereby enabling the location of the leak and the extent of the moisture intrusion to be determined.

5. A leak detection system for composite roof structures comprising a plurality of self-contained, indenpendent moisture detecting and signalling units adapted to be place in a predetermined spaced apart insular arrangement beneath a water impermeable membrane of the roof strucutre, each of said leak signalling and detecting units comprising:

moisture detecting and power supply means adapted to be activated and to produce electrical energy upon the introduction of water above a predetermined amount, said moisture detecting and power supply means comprising a water-activatable power source which is rendered active upon contact with moisture when a leak occurs, signalling means connected to said moisture detecting means for emitting a signal upon activation of said moisture detecting means.

6. A leak detection system according to claim 5 further comprising a signal receiving means for locating the activated signalling means thereby enabling the location of the leak and the extent of the moisture intrusion to be determined.

7. A leak detection system for composite roof structures comprising a plurality of self-contained, independent moisture detecting units adapted to be placed in a predetermined spaced apart insular arrangement beneath a water impermeable membrane of the roof structure, each of said leak signalling and detecting units comprising:

moisture detecting and power supply means comprising a water activatable batter adapted to be activated and to produce electrical energy upon the introduction of moisture above a predetermined amount, signalling means connected to said moisture detecting and power supply means for emitting a signal upon activation of said moisture detecting and power supply means, and housing means enclosing said moisture detecting and power supply means and said signalling means to protect said moisture detecting means and said signalling means and said signalling ingress of moisture if a leak occurs.

8. A leak detection system according to claim 7 further comprising a signal receiving means for locating the activated signalling means thereby enabling the location of the leak and the extent of the moisture intrusion to be determined.

9. A leak detection system according to claim 1 wherein said signalling means comprises a radio transmitter emitting a pulse coded output signal.

* * * * *